United States Patent
Zhang et al.

(10) Patent No.: US 11,532,151 B2
(45) Date of Patent: Dec. 20, 2022

(54) VISION-LIDAR FUSION METHOD AND SYSTEM BASED ON DEEP CANONICAL CORRELATION ANALYSIS

(71) Applicant: Tsinghua University, Beijing (CN)

(72) Inventors: Xinyu Zhang, Beijing (CN); Li Wang, Beijing (CN); Jun Li, Beijing (CN); Lijun Zhao, Beijing (CN); Zhiwei Li, Beijing (CN); Shiyan Zhang, Beijing (CN); Lei Yang, Beijing (CN); Xingang Wu, Beijing (CN); Hanwen Gao, Beijing (CN); Lei Zhu, Beijing (CN); Tianlei Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/732,540

(22) Filed: Apr. 29, 2022

(65) Prior Publication Data
US 2022/0366681 A1   Nov. 17, 2022

(30) Foreign Application Priority Data

May 10, 2021  (CN) .......................... 202110506552.X (51) Int. Cl.
*G06T 7/00*   (2017.01)
*G06V 10/80*   (2022.01)
(Continued)

(52) U.S. Cl.
CPC ......... *G06V 10/806* (2022.01); *G06N 3/0454* (2013.01); *G06T 7/73* (2017.01);
(Continued)

(58) Field of Classification Search
CPC ...... G06V 10/806; G06V 10/40; G06V 10/82; G06V 20/588; G06N 3/0454; G06T 7/73;
(Continued)

(56) References Cited

U.S. PATENT DOCUMENTS 11,189,049 B1 * 11/2021 Chakravarty ............ G06N 3/08
11,238,643 B1 * 2/2022 Yang ....................... G06V 20/56
(Continued)

FOREIGN PATENT DOCUMENTS

CN   109034077 A   12/2018
CN   111291714 A   6/2020
(Continued)

OTHER PUBLICATIONS

Lei Gao, et al., Information Fusion via Deep Cross-Modal Factor Analysis, IEEE, 2019.
(Continued)

*Primary Examiner* — Ping Y Hsieh
(74) *Attorney, Agent, or Firm* — Bayramoglu Law Offices LLC (57) ABSTRACT

A vision-LiDAR fusion method and system based on deep canonical correlation analysis are provided. The method comprises: collecting RGB images and point cloud data of a road surface synchronously; extracting features of the RGB images to obtain RGB features; performing coordinate system conversion and rasterization on the point cloud data in turn, and then extracting features to obtain point cloud features; inputting point cloud features and RGB features into a pre-established and well-trained fusion model at the same time, to output feature-enhanced fused point cloud features, wherein the fusion model fuses RGB features to point cloud features by using correlation analysis and in combination with a deep neural network; and inputting the fused point cloud features into a pre-established object detection network to achieve object detection. A similarity calculation matrix is utilized to fuse two different modal features.

16 Claims, 2 Drawing Sheets

(51) Int. Cl.
*G06V 10/40* (2022.01)
*G06V 10/82* (2022.01)
*G06V 20/56* (2022.01)
*G06N 3/04* (2006.01)
*G06T 7/73* (2017.01)

(52) U.S. Cl.
CPC .............. *G06V 10/40* (2022.01); *G06V 10/82* (2022.01); *G06V 20/588* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC . G06T 2207/10024; G06T 2207/10028; G06T 2207/20081; G06T 2207/20084
See application file for complete search history.

(56) References Cited

U.S. PATENT DOCUMENTS

| | | | |
|---|---|---|---|
| 2016/0188986 | A1* | 6/2016 | Aoki ..................... G06T 7/73 348/135 |
| 2018/0330149 | A1* | 11/2018 | Uhlenbrock ......... G06V 20/653 |
| 2019/0011927 | A1 | 1/2019 | Mou |
| 2019/0056748 | A1* | 2/2019 | Budihal ............... G05D 1/0088 |
| 2019/0108639 | A1 | 4/2019 | Tchapmi et al. |

FOREIGN PATENT DOCUMENTS

| | | |
|---|---|---|
| CN | 111612059 A | 9/2020 |
| CN | 111681212 A | 9/2020 |
| CN | 111860695 A | 10/2020 |
| CN | 112149550 A | 12/2020 |
| CN | 112200303 A | 1/2021 |
| CN | 112270228 A | 1/2021 |
| CN | 112270249 A | 1/2021 |

OTHER PUBLICATIONS

Sun Quan-Sen, et al., The Theory of Canonical Correlation Analysis and Its Application to Feature Fusion, Chinese Journal of Computers, 2005, pp. 1524-1533, vol. 28, No. 9.

* cited by examiner

VISION-LIDAR FUSION METHOD AND SYSTEM BASED ON DEEP CANONICAL CORRELATION ANALYSIS

CROSS REFERENCE TO THE RELATED APPLICATIONS

This application is based upon and claims priority to Chinese Patent Application. No. 202110506552.X filed on May 10, 2021 the entire contents of which are incorporated herein by reference.

TECHNICAL FIELD

The present invention relates to the technical field of autonomous driving, in particular to a vision-LiDAR fusion method and system based on deep canonical correlation analysis.

BACKGROUND

In recent years, the field of autonomous driving technology has developed rapidly, and the environmental perception technology is an indispensable part therein. Autonomous driving vehicles rely on such sensors as LiDAR, cameras, and millimeter wave radars to perceive the surrounding environment and to collect and process environmental information and in-vehicle information, mainly involving such technologies as road boundary monitoring, vehicle detection and pedestrian detection. Environmental perception may provide feedback real-time information about the road to the vehicle, so as to more accurately control the driving behavior of the vehicle and improve driving safety and comfort.

As one of the basic functions of the autonomous driving system, three-dimensional object detection may be considered as an important part of environmental perception, mainly to detect vehicles, pedestrians, and other traffic participants in the scene. This function provides distribution information of spatial obstacles for subsequent planning and control of autonomous driving vehicles, which is related to driving safety issues and may cause very serious consequences if mistakes are made.

Currently, the three-dimensional object detection technology has been studied to a certain extent both at home and abroad. From the perspective of hardware, the data input sources for three-dimensional object detection tasks mainly come from two types of sensors including cameras and LiDARs. As a light-sensitive component with a pinhole model, the camera will provide RGB image information similar to the intuitive perception of human eyes; while as an active collection sensor, the LiDAR may obtain real spatial coordinate information of an object in the scene through transmitting and receiving laser light.

From the current research status in the field, such two types of sensors are both widely used for three-dimensional object detection. However, such two types of sensors have certain drawbacks. For the camera, as a dense two-dimensional representation, RGB images express spatial information through pixel positions and pixel values, thereby compressing depth information in the Z axis, which may lead to difficulties in predicting an absolute spatial position of objects in three-dimensional object detection tasks; in addition, camera lenses are also very sensitive to changes in light and overexposed or too dark situations often occur, and the data collected in such scenes are difficult to identify and valid information is missing. For the LiDAR, although precise spatial position information of the object may be obtained, but as an active sensor, LiDAR may only accept a laser signal emitted by the sensor, and may not accept the signal reflected by the object through visible light, therefore, the color texture and other feature information of the object may not be obtained; in addition, the laser wavelength is very short, therefore, data of the LiDAR are very sensitive to special weather, for example, the LiDAR point cloud obtained under rain and snow usually has lots of noisy points.

In summary, if images are used as the main input information, the detection system will malfunction seriously when image information is missing due to changes in illumination and other conditions, and in addition, a lack of spatial distance information in the images also leads to a shortcoming in detection. Although the LiDAR point cloud may overcome the problem of changes in illumination, the sparseness and disorder of the point cloud also limit the detection capability, and small objects beyond 100 meters may not be detected likely, which is not conducive to the perception of a vehicle at high speed. Therefore, aiming at the problem of insufficient detection capability when only vehicle-mounted cameras or LiDARs are used, a novel idea is to consider combining more sensors and fusing data to improve the ability to perceive the environment. However, a large number of experiments at this stage show that simple pixel-level fusion of the point cloud information obtained by the LiDAR and the RGB images obtained by the camera not only may not improve the precision of the perception algorithm, but also has a negative effect, thereby usually lowering the perception precision to some extent.

SUMMARY

The objective of the present invention is to overcome shortcomings of the prior art and provide a vision-LiDAR fusion method and system based on deep canonical correlation analysis.

To achieve the above objective, the present invention provides a vision-LiDAR fusion method based on deep canonical correlation analysis, and the method includes:

collecting RGB images and point cloud data of a road surface synchronously;

extracting features of the RGB images to obtain RGB features;

performing coordinate system conversion and rasterization on the point cloud data in turn, and then extracting features to obtain point cloud features;

inputting point cloud features and RGB features into a pre-established and well-trained fusion model at the same time, to output feature-enhanced fused point cloud features, wherein the fusion model fuses RGB features to point cloud features by using correlation analysis and in combination with a deep neural network; and inputting the fused point cloud features into a pre-established object detection network to achieve object detection.

As an improvement of the above method, the performing coordinate system conversion and rasterization on the point cloud data in turn, and then extracting features to obtain point cloud features is specifically as follows:

converting the point cloud data from a point cloud coordinate system to an image coordinate system, wherein each pixel point after conversion corresponds to a point in space;

performing H×W rasterization on an x–y plane under the image coordinate system, and forming h×W=P pillars after rasterization, wherein H and W respectively represent the number of grids in the x and y directions in a two-dimensional plane; obtaining the distances $X_c$, $Y_c$, $Z_c$ from the point cloud to its center of gravity O in the pillar and projections $X_p$, $Y_p$ from the point cloud to the point O in the x and y directions according to real three-dimensional coordinates and reflectivity of a certain point cloud, and obtaining enhanced 9-dimensional point cloud features in combination with the real three-dimensional coordinates and reflectivity of the point cloud to form a tensor of (9, P, N) Wherein N represents the number of point clouds in each pillar; and for each pillar, using a PonitNet algorithm to extract features, to generate a vector of (64, P, N), wherein 64 represents 64-dimensional, and then performing the operation of taking a maximum value and linear processing to obtain a pseudo image of (256, H, W), wherein 256 represents 256-dimensional.

As an improvement of the above method, point cloud features and RGB features are input into the fusion model, the cloud point feature X is a vector of (256, P), the RGB feature Y is a vector of (64, P), P is the number of pillars, the point cloud feature after fusion is output and is a vector of (64, P); the fusion model includes a non-linear structural feature extraction unit and a correlation analysis unit; wherein the non-linear structural feature extraction unit is configured to extract a non-linear structure $f$ of the point cloud feature X and the non-linear structure g of the RGB feature Y, respectively; and the correlation analysis unit is configured to perform correlation maximization on the extracted non-linear structure $f$ and the non-linear structure g through a correlation analysis method.

As an improvement of the above method, the non-linear structural feature extraction unit includes a first deep neural network model and a second deep neural network model, wherein the first deep neural network model includes extracting a deep neural network model $f(X; W_f)$ of the non-linear structure of the point cloud feature X, to obtain the non-linear structure $f$ of the point cloud feature X, wherein $W_f$ represents the deep neural network model; and the second deep neural network model includes extracting a deep neural network model $g=g(Y; W_g)$ of the non-linear structure of the RGI feature Y, to obtain the non-linear structure g of the RGB feature Y, wherein $W_g$ represents the deep neural network model.

As an improvement of the above method, the specific processing process of the correlation analysis unit includes:

maximizing correlations of the extracted non-linear structures $f$ and g through the correlation analysis method:

$$\max_{W_f, W_g, U, V} \frac{1}{N} tr\left(U^T f(X; W_f) g(Y; W_g)^T V\right)$$

$$\text{s.t. } U^T\left(\frac{1}{N} f(X; W_f) f(X; W_f)^T + r_x I\right) U = I$$

$$V^T\left(\frac{1}{N} g(Y; W_g) g(Y; W_g)^T + r_y I\right) V = I$$

$$u_i^T f(X; W_f) g(Y; W_g)^T v_j = 0, i \neq j$$

wherein N represents the number of point cloud in each pillar, $U=[u_1 \ u_2 \ \ldots \ u_L]$, $V=[v_1 \ v_2 \ \ldots \ v_L]$ are respectively mapping matrixes of output features of the first deep neural network and the second deep neural network by correlation analysis, L represents the total number of elements of the mapping matrix U and the total number of elements of the mapping matrix V, $u_i$ is the i-th element of the mapping matrix U and $v_j$ is the j-th element of the mapping matrix V, T represents transposition, 1 is the feature after fusion, $r_x>0$, $r_y>0$, $r_x$ are regularization parameters for the estimation of the sample covariance of the point cloud feature X, and $r_y$ is a regularization parameter for the estimation of the sample covariance of the RGB feature Y.

As an improvement of the above method, the method further includes a step of training the fusion model, specifically including:

selecting data of a public data set KITTI as a training set, wherein the training set includes RGB images and point cloud data;

extracting features of the RGB images in the training set to obtain RGB features;

performing coordinate system conversion and rasterization on the point cloud data in the data set in turn, and then adopting a PointNet algorithm to extract features, to obtain point cloud features; and inputting RGB features and point cloud features into a fusion model, and adopting a stochastic gradient descent method to optimize parameters of the fusion model, to obtain a well-trained fusion model.

A vision-LiDAR fusion system based on deep canonical correlation analysis is provided, and the system includes: a pre-established and well-trained fusion model, a collection module, an RGB feature extraction module, a point cloud feature extraction module, a fusion output module and an object detection module, wherein the collection module is configured to collect RGB images and point cloud data of a road surface synchronously;

the RGB feature extraction module is configured to extract features of the RGB images to obtain RGB features;

the point cloud feature extraction module is configured to perform coordinate system conversion and rasterization on the point cloud data in turn, and then extract features to obtain point cloud features;

the fusion output module is configured to input point cloud features and RGB features into a pre-established and well-trained fusion model at the same time, to output feature-enhanced fused point cloud features, wherein the fusion model fuses RGB features to point cloud features by using correlation analysis and in combination with a deep neural network; and the object detection module is configured to input the fused point cloud features into a pre-established object detection network to achieve object detection.

A terminal device includes: a memory, a processor and computer programs stored on the memory and capable of running on the processor, wherein the processor implements the method of any of claims 1-6 when executing the computer programs.

A storage medium includes a memory, a processor and computer programs stored on the memory and capable of running on the processor, wherein the processor implements the method of any of claims 1-6 when executing the computer programs.

Compared with the prior art, the present invention has the following advantages:

In the present invention, a Deep CCA method is innovatively used and a similarity calculation matrix is utilized to fuse two different modal features including point cloud and images, wherein Deep CCA first uses a deep neural network to obtain the linearized vectors of the two modalities separately, then obtains the maximum correlation between the two projection vectors, and finally obtains the new projection vector; and a method of point-by-point fusion of image point cloud features is used for fusion, so as to improve precision under the condition of necessary speed compromise.

DETAILED DESCRIPTION OF THE EMBODIMENTS

The present invention is provided aiming at the above problem. The present invention provides a multimodal fusion method of vision and LiDAR based on deep canonical correlation analysis, which may effectively attach RGB features to enhance the information content of point cloud. The process is a way a point cloud feature enhancement, to fuse RGB features to point cloud features by using canonical correlation analysis in combination with a deep neural network, and the enhanced point cloud is used for three-dimensional object detection, which may verify the effectiveness of the method.

It should be understood that some simplifications or omissions may be made to this part and to the abstract of the specification and the title of the invention of the present application, to avoid obscuring the purpose of this part, the abstract of the specification and the title of the invention, and such simplifications or omissions may not be used to limit the scope of the present invention.

According to the present invention, a multimodal fusion method of Vision and LiDAR based on deep canonical correlation analysis is provided, including the following steps:

Step 1, collecting the LiDAR point cloud (replaced by PC in the following text) and the camera image (replaced by I in the following text) of the autonomous driving vehicle, wherein calibration and alignment have been finished by default.

Step 2, converting the point cloud data from a point cloud coordinate system to an image coordinate system, wherein each pixel point after conversion corresponds to a point in a space, then performing H×W rasterization on an x-y plane under the image coordinate system, and forming H×W=P pillars after rasterization, wherein as to the point cloud, x, y, z, r represent the real coordinates and reflectivity, and $X_c$, $Y_c$, $Z_c$, $X_p$, $Y_p$ represent the coordinate features. Wherein $X_c$, $Y_c$, $Z_c$ represent the distance between a point cloud and the arithmetic mean of all the points (i.e., the distance to the center of the pillar), respectively, and $X_p$, $Y_p$ represent an offset to the center x, y of the pillar. The enhanced PC feature becomes 9-dimensional. P represents the number of non-empty pillars, N represents the number of point clouds of each pillar (sampling is performed on the point cloud whose number is greater than N, and 0 is added to the point cloud whose number is less than N), and finally the Tensor of (D, P, N) is formed.

Step 3, for each point, using a PonitNet algorithm to extract features, to generate a vector of (C, P, N) (C represents the feature dimensionality), then the operation of taking a maximum value is used to generate ($C_1$, P), and a pseudo image of ($C_1$, H, W) is generated.

Step 4, designing a CCA module for the fusion of laser point cloud PC and image I according to the multi-source information input, and extracting features of the two source data by using a convolutional neural network, respectively.

Step 5, feeding the enhanced point cloud into the existing point cloud three-dimensional object detection framework to verify that the three-dimensional object detection precision is improved.

Compared with the prior works, in the present invention, multi-source information is effectively fused by using a CCA mechanism, such that the advantages of two types of data complement each other, thereby improving the accuracy of the three-dimensional object detection algorithm; the previous classical feature fusion methods include: concatenation and add, and the disadvantages lies in that the complementarity between multimodal data may not be fully utilized, and the problem of information redundancy exists. At present, the difficulty in fusing PC and RGB lies in that the dimensionality of PC and RGB features after fusion is too high, and effective processing is difficult when the input feature dimensionality is too large and a great redundancy exists. For better analysis of features, the current feature space is projected to another feature space, so as to achieve the effect of dimensionality reduction. Therefore, canonical correlation analysis (CCA) is introduced to the present invention to fuse features. The CCA-based fusion method uses the correlation between two input features to calculate two conversions, and the converted features have a higher correlation than the two input feature sets. However, the CCA may not calculate the non-linear correlation between data, so Deep CCA is used in the fusion of point cloud and images based on a neural network. In the present invention, verification is performed in common three-dimensional object detection tasks, which may increase the precision of object detection, especially significantly improving the precision of small objects such as pedestrians and cyclists.

Technical solutions of the present invention will he described in detail below in combination with accompanying drawings and embodiments.

Embodiment 1

Figure 1:
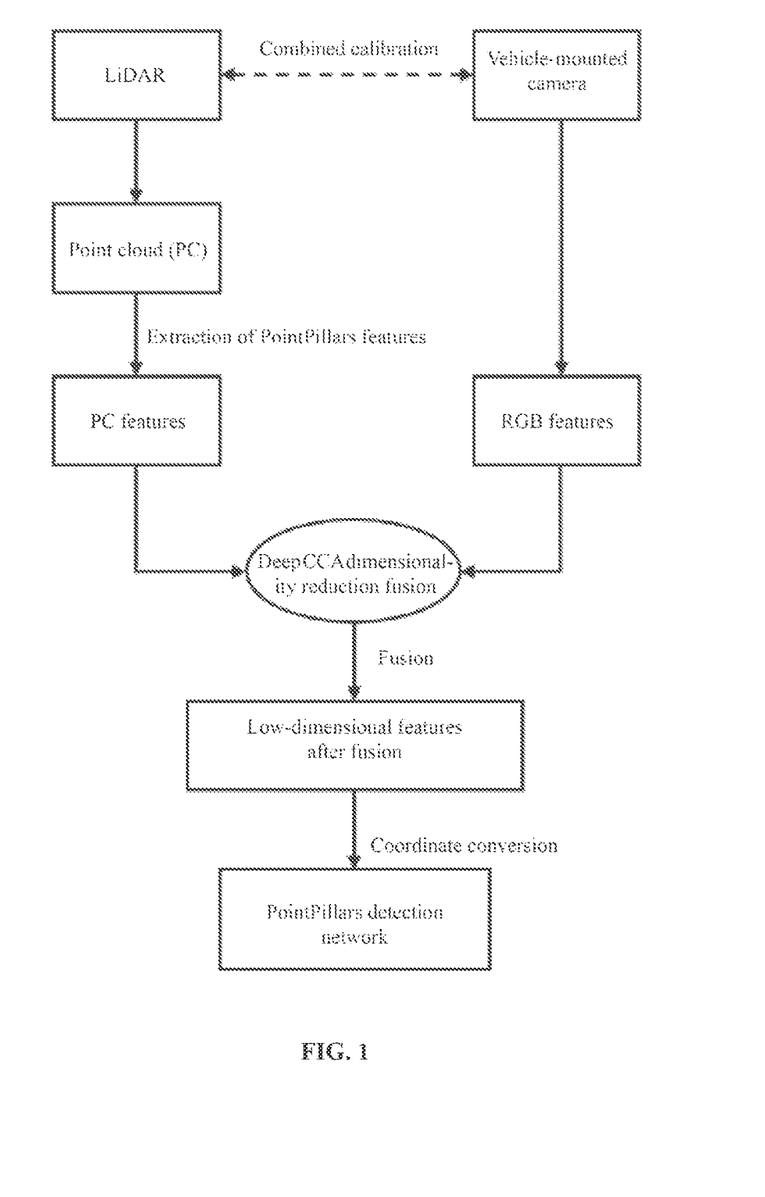
FIG. 1 is a flow diagram of a vision-LiDAR fusion method based on deep canonical correlation analysis provided in Embodiment 1 of the present invention.

As shown in FIG. 1, Embodiment 1 of the present invention provides a vision-LiDAR fusion method based on deep canonical correlation analysis, including the following steps:

Step 1, collecting the LiDAR point cloud and camera images in the autonomous driving scene, wherein calibration and alignment have been finished by default. Since the verification of the algorithm should be guaranteed to be public and effective, relevant experiments are conducted in the public data set KITTI.

Step 2, fusing the LiDAR point cloud data and RGB data.

The original LiDAR data is a point cloud, and the point cloud in KITTI can be represented as a matrix of [N, 4], wherein N is the number of point cloud in a frame of the scene, and four-dimensional features of each point are [x, y, z, i], which are spatial x, y, z coordinates and laser reflection intensity i, respectively.

Two sets of N vectors are given: x represents image features and y represents point cloud feature. Suppose that the covariances of x and y are $\Sigma xx$ and $\Sigma yy$, respectively, then let $\Sigma xy$ be a cross-covariance. Linear canonical correlation analysis (CCA) seeks a linear projection pair that maximizes the correlation of two features, while for the above two modal data, deep CCA uses two deep neural network models $f=\theta(X; W_f)$ and $g=g(Y; W_g)$ to learn the non-linear structures of X and Y, respectively, wherein $W=[w_f; W_g]$ refer to the neural network model parameters, and then the correlation of extracted features $f$ and $g$ is maximized through CCA as follows:

$$\max_{W_f, W_g, U, V} \frac{1}{N} tr\left(U^T f(X; W_f) g(Y; W_g)^T V\right)$$

$$\text{s.t. } U^T\left(\frac{1}{N} f(X) f(X)^T + r_x I\right) U = I$$

$$V^T\left(\frac{1}{N} g(Y) g(Y)^T + r_y I\right) V = I$$

$$u_i^T f(X) g(Y)^T v_j = 0, i \neq j$$

In the formula, $U=[u_1 u_2 \ldots u_L]$, $V=[v_1 v_2 \ldots v_L]$ are mapping matrixes of output features of the deep neural network by CCA, and $r_x>0, r_y>0$ are regularization parameters for the estimation of the sample covariance. Different from CCA, deep CCA has no fixed solution, and as to its parameters, a stochastic gradient descent method should be adopted to optimize weights of deep CCA.

Figure 2:
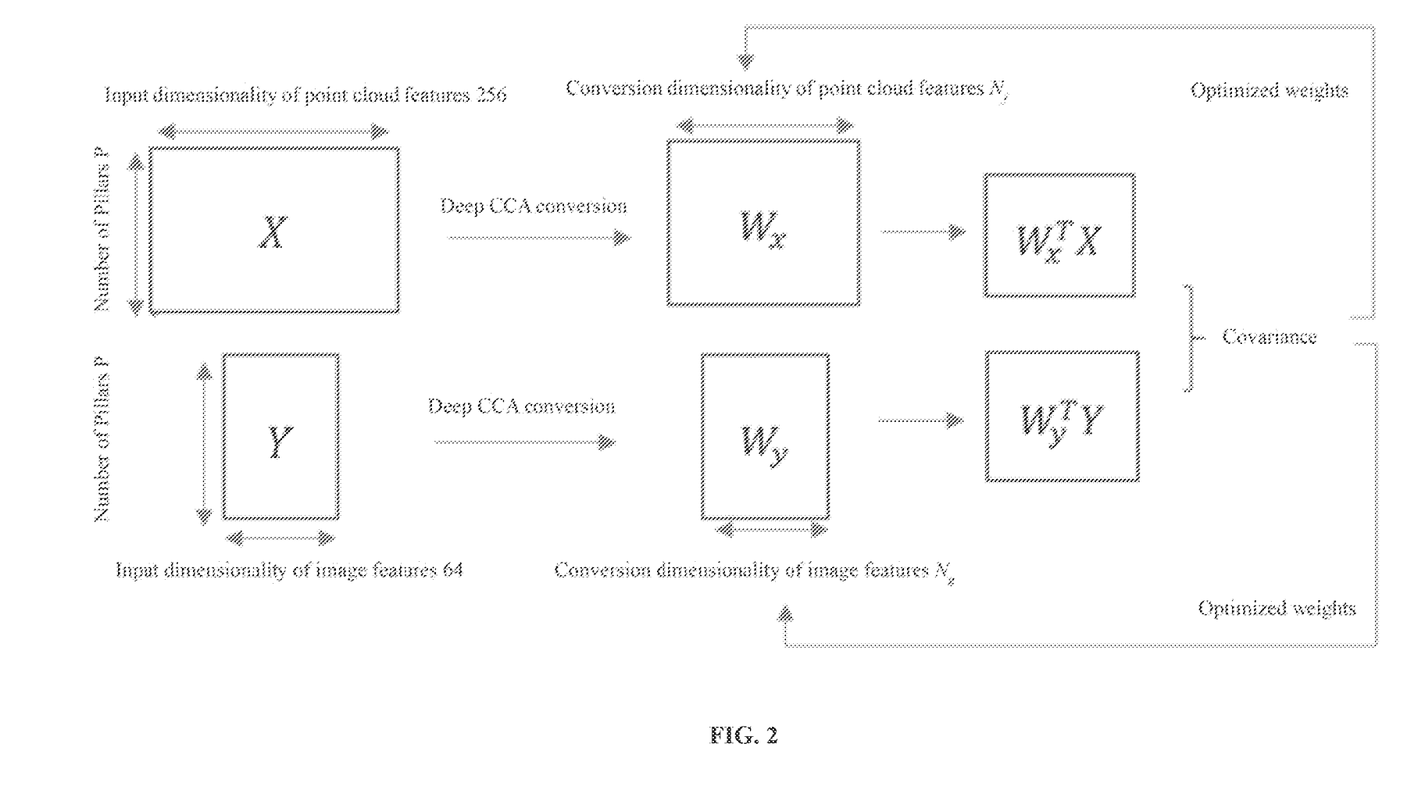
FIG. 2 is a schematic diagram of a fusion model network structure provided in Embodiment 1 of the present invention.

Step 3, FIG. 2 shows a structural diagram of a point cloud-image fusion model of the present invention, including three parts such as network structural design, model training and model test. It should be noted that, the hardware and software platforms for building, training, and testing the point cloud-image fusion model based on deep canonical correlation analysis are Ubuntu 16.04+RTX2080Ti+pytorch1.7+cuda10.1+python3.7. In the following description of steps, the theoretical methods that are basically mastered by those skilled in the art will not be described too much.

The design of network structure mainly includes the following steps:

1) In the feature fusion approach, CCA linearly converts the multidimensional X and Y into one-dimensional X' and Y', and then uses the correlation coefficient to see the correlation between X' and Y', to change the data from multidimensional to one-dimensional, and then uses the correlation coefficient for correlation analysis. That is, the correlation between two modalities is maximized, to learn and obtain the maximum correlation subspace and output the projection matrix corresponding to each modality. However, CCA may not calculate the non-linear correlation between data, so CCA based on a deep neural network, i.e. deep CCA, is used in the fusion of point cloud and images.

The specific implementation mode is as follows:

1) First, ensure that the scales of the two types of input information are consistent, so first for the RGB, image features are extracted through a convolutional neural network, and the dimensionality is (64, P), wherein P is the number of pillars, for point cloud features, point cloud features generated by the network are extracted through a PointNet algorithm, and the dimensionality is (256, P).

2) Then, the two parts of features are converted from matrixes to vectors and are subjected to deep CCA dimensionality reduction. At this time, the newly generated feature map is just the point cloud features obtained by the CCA module, with the dimensionality being (64, P).

3) The newly generated point cloud features are fed into the PointPillars detection network, that is, the two-dimensional convolutional backbone of the pseudo images, and finally return to detect the three-dimensional frame.

Step 4, taking the enhanced point cloud data as the input of a common three-dimensional object detection algorithm to verify the effectiveness of feature enhancement.

Embodiment 2

Embodiment 2 of the present invention provides a vision-LiDAR fusion system based on deep canonical correlation analysis, and the system includes: a pre-established and well-trained fusion model, a collection module, an RGB feature extraction module, a point cloud feature extraction module, a fusion output module and an object detection module, wherein the collection module is configured to collect RGB images and point cloud data of a road surface synchronously;

the RGB feature extraction module is configured to extract features of the RGB images to obtain RGB features;

the point cloud feature extraction module is configured to perform coordinate system conversion and rasterization on the point cloud data in turn, and then extract features to obtain point cloud features;

the fusion output module is configured to input point cloud features and RGB features into a pre-established and well-trained fusion model at the same time, to output feature-enhanced fused point cloud features, wherein the fusion model fuses RGB features to point cloud features by using correlation analysis and in combination with a deep neural network; and the object detection module is configured to input the fused point cloud features into a pre-established object detection network to achieve object detection.

Embodiment 3

A computer device includes a memory, a processor and computer programs stored on the memory and capable of running on the processor, wherein the processor implements the method of Embodiment 1 when executing the computer programs. Embodiment 4

A computer-readable storage medium is provided, the computer-readable storage medium stores computer programs, and the processor is enabled to implement the method of Embodiment 1 when the computer programs are executed by the processor.

Finally, it should be noted that the above embodiments are merely used to illustrate rather than limit technical solutions of the present invention. Although the present invention is described in detail with reference to the embodiments, those skilled in the art should understand that any modification or equivalent substitution made to the technical solutions of the present invention does not depart from the spirit and scope of the technical solutions of the present invention, and shall all fall within the scope of the claims of the present invention.

The invention claimed is:

1. A vision-LiDAR fusion method based on deep canonical correlation analysis, comprising:
collecting RGB images and point cloud data of a road surface synchronously;
extracting features of the RGB images to obtain RGB features;

performing coordinate system conversion and rasterization on the point cloud data in turn and extracting features to obtain point cloud features;

inputting the point cloud features and the RGB features into a pre-established and well-trained fusion model at the same time to output feature-enhanced fused point cloud features, wherein the pre-established and well-trained fusion model fuses the RGB features to the point cloud features by using correlation analysis and in combination with a deep neural network; and inputting the feature-enhanced fused point cloud features into a pre-established object detection network to achieve object detection;

wherein when the point cloud features and the RGB features are inputted into the pre-established and well-trained fusion model, the cloud point features X is a vector of (256, P), the RGB features Y is a vector of (64, P), and P is the number of pillars; the point cloud features after fusion is outputted as a vector of (64, P);

the pre-established and well-trained fusion model comprises a non-linear structural feature extraction unit and a correlation analysis unit; wherein the non-linear structural feature extraction unit is configured to extract a non-linear structure $f$ of the point cloud features X and the non-linear structure g of the RGB features Y, respectively; and the correlation analysis unit is configured to perform a correlation maximization on the extracted non-linear structure $f$ and the non-linear structure g with a correlation analysis method.

2. The vision-LiDAR fusion method based on deep canonical correlation analysis of claim 1, wherein the performing coordinate system conversion and rasterization on the point cloud data in turn and extracting features to obtain point cloud features further comprises:

converting the point cloud data from a point cloud coordinate system to an image coordinate system, wherein each pixel point after conversion corresponds to a point in space;

performing a H×W rasterization on an x-y plane under the image coordinate system, and forming H×W=P pillars after the H×W rasterization, wherein H and W respectively represent a number of grids in x and y directions in a two-dimensional plane; obtaining distances $X_c$, $Y_c$, $Z_c$ from a point cloud to a center of gravity O in the P pillars and projections $X_p$, $Y_p$ from the point cloud to the center of gravity O in the x and y directions according to real three-dimensional coordinates and reflectivity of the point cloud, and obtaining enhanced 9-dimensional point cloud features in combination with the real three-dimensional coordinates and reflectivity of the point cloud to form a tensor of (9, P, N), wherein N represents a number of point clouds in each pillar; and extracting features, for each pillar, using a PonitNet algorithm, to generate a vector of (64, P, N), wherein 64 represents 64-dimensional, and then performing an operation of taking a maximum value and linear processing to obtain a pseudo image of (256, H, W), wherein 256 represents 256-dimensional.

3. The vision-LiDAR fusion method based on deep canonical correlation analysis of claim 2, wherein the non-linear structural feature extraction unit comprises a first deep neural network model and a second deep neural network model, wherein the first deep neural network model extracts a deep neural network model $f(X; W_f)$ of the non-linear structure of the point cloud features X, to obtain the non-linear structure $f$ of the point cloud features X, wherein $W_\theta$ represents the first deep neural network model; and the second deep neural network model extracts a deep neural network model $g=g(Y; W_g)$ of the non-linear structure of the RGB features Y, to obtain the non linear structure g of the RGB features Y, wherein $W_g$ represents the second deep neural network model.

4. The vision-LiDAR fusion method based on deep canonical correlation analysis of claim 3, wherein a specific processing process of the correlation analysis unit comprises:

maximizing correlations of the extracted non-linear structures $f$ and g through the correlation analysis method:

$$\max_{W_f, W_g, U, V} \frac{1}{N} tr\left(U^T f(X; W_f) g(Y; W_g)^T V\right)$$

$$\text{s.t. } U^T\left(\frac{1}{N} f(X; W_f) f(X; W_f)^T + r_x I\right) U = I$$

$$V^T\left(\frac{1}{N} g(Y; W_g) g(Y; W_g)^T + r_y I\right) V = I$$

$$u_i^T f(X; W_f) g(Y; W_g)^T v_j = 0, i \neq j$$

wherein N represents the number of point cloud in each pillar, $U=[u_1 u_2 \ldots u_L]$, $V=[v_1 v_2 \ldots v_L]$ are respectively mapping matrixes of output features of the first deep neural network and the second deep neural network by correlation analysis, L represents a total number of elements of the mapping matrix U and a total number of elements of the mapping matrix V, $u_i$ is an i-th element of the mapping matrix U and $v_j$ is a j-th element of the mapping matrix V, T represents transposition, I is a feature after fusion, $r_x>0, r_y>0$, $r_x$ are regularization parameters for an estimation of a sample covariance of the point cloud features X, and $r_y$ is a regularization parameter for an estimation of a sample covariance of the RGB features Y.

5. The vision-LiDAR fusion method based on deep canonical correlation analysis of claim 4, wherein the vision-LiDAR fusion method further comprises a step of training a fusion model, comprising:

selecting data of a public data set KITTI as a training set, wherein the training set comprises public RGB images and public point cloud data;

extracting features of the public RGB images in the training set to obtain public RGB features;

performing coordinate system conversion and rasterization on the public point cloud data in the public data set in turn and adopting a PointNet algorithm to extract features to obtain public point cloud features; and inputting the public RGB features and the public point cloud features into the fusion model, and adopting a stochastic gradient descent method to optimize parameters of the fusion model and obtain a well-trained fusion model.

6. A storage medium, comprising a memory, a processor, and computer programs stored on the memory and capable of running on the processor, wherein the processor implements the vision-LiDAR fusion method of claim 1 when executing the computer programs.

7. The storage medium according to claim 6, wherein the performing coordinate system conversion and rasterization on the point cloud data in turn and extracting features to obtain point cloud features further comprises:

converting the point cloud data from a point cloud coordinate system to an image coordinate system, wherein each pixel point after conversion corresponds to a point in space;

performing a H×W rasterization on an x-y plane under the image coordinate system, and forming H×W=P pillars after the H×W rasterization, wherein H and W respectively represent a number of grids in x and y directions in a two-dimensional plane; obtaining distances $X_c$, $Y_c$, $Z_c$ from a point cloud to a center of gravity O in the P pillars and projections $X_p$, $Y_p$ from the point cloud to the center of gravity O in the x and y directions according to real three-dimensional coordinates and reflectivity of the point cloud, and obtaining enhanced 9-dimensional point cloud features in combination with the real three-dimensional coordinates and reflectivity of the point cloud to form a tensor of (9, P, N), wherein N represents a number of point clouds in each pillar; and extracting features, for each pillar, using a PonitNet algorithm, to generate a vector of (64, P, N), wherein 64 represents 64-dimensional, and then performing an operation of taking a maximum value and linear processing to obtain a pseudo image of (256, H, W), wherein 256 represents 256-dimensional.

8. The storage medium according to claim 7, wherein the non-linear structural feature extraction unit comprises a first deep neural network model and a second deep neural network model, wherein the first deep neural network model extracts a deep neural network model $f(X; W_f)$ of the non-linear structure of the point cloud features X, to obtain the non-linear structure $f$ of the point cloud features X, wherein $W_f$ represents the first deep neural network model; and the second deep neural network model extracts a deep neural network model $g=g(Y; W_g)$ of the non-linear structure of the RGB features Y, to obtain the non-linear structure g of the RGB features Y, wherein $W_g$ represents the second deep neural network model.

9. The storage medium according to claim 8, wherein a specific processing process of the correlation analysis unit comprises:

maximizing correlations of the extracted non-linear structures $f$ and g through the correlation analysis method:

$$\max_{W_f, W_g, U, V} \frac{1}{N} tr(U^T f(X; W_f) g(Y; W_g)^T V)$$

$$s.t. \ U^T \left(\frac{1}{N} f(X; W_f) f(X; W_f)^T + r_x I\right) U = I$$

$$V^T \left(\frac{1}{N} g(Y; W_g) g(Y; W_g)^T + r_y I\right) V = I$$

$$u_i^T f(X; W_f) g(Y; W_g)^T v_j = 0, \ i \ne j$$

wherein N represents the number of point cloud in each pillar, $U=[u_1 u_2 \ldots u_L]$, $V=[v_1 v_2 \ldots v_L]$ are respectively mapping matrixes of output features of the first deep neural network and the second deep neural network by correlation analysis, L represents a total number of elements of the mapping matrix U and a total number of elements of the mapping matrix V, $v_i$ is an i-th element of the mapping matrix U and $v_j$ is a j-th element of the mapping matrix V, T represents transposition, I is a feature after fusion, $r_x>0, r_y>0$, $r_x$ are regularization parameters for an estimation of a sample covariance of the point cloud features X, and $r_y$ is a regularization parameter for an estimation of a sample covariance of the RGB features Y.

10. The storage medium according to claim 9, wherein the vision-LiDAR fusion method further comprises a step of training a fusion model, comprising:

selecting data of a public data set KITTI as a training set, wherein the training set comprises public RGB images and public point cloud data;

extracting features of the public RGB images in the training set to obtain public RGB features;

performing coordinate system conversion and rasterization on the public point cloud data in the public data set in turn and adopting a PointNet algorithm to extract features to obtain public point cloud features; and inputting the public RGB features and the public point cloud features into the fusion model, and adopting a stochastic gradient descent method to optimize parameters of the fusion model and Obtain a well-trained fusion model.

11. A vision-LiDAR fusion system based on deep canonical correlation analysis, wherein the vision-LiDAR fusion system comprises: a pre-established and well-trained fusion model, a collection module, an RGB feature extraction module, a point cloud feature extraction module, a fusion output module and an object detection module, wherein the collection module is configured to collect RGB images and point cloud data of a road surface synchronously;

the RGB feature extraction module is configured to extract features of the RGB images to obtain RGB features;

the point cloud feature extraction module is configured to perform coordinate system conversion and rasterization on the point cloud data in turn and extract features to obtain point cloud features;

the fusion output module is configured to input the point cloud features and the RGB features into the pre-established and well-trained fusion model at the same time to output feature-enhanced fused point cloud features, wherein the pre-established and well-trained fusion model fuses the RGB features to the point cloud features by using correlation analysis with a deep neural network; and the object detection module is configured to input the feature-enhanced fused point cloud features into a pre-established object detection network to achieve object detection;

wherein when the point cloud features and the RGB features are inputted into the fusion model, the cloud point features X is a vector of (256, P), the RGB features Y is a vector of (64, P), and P is a number of pillars; the point cloud features after fusion is outputted as a vector of (64, P); the pre-established and well-trained fusion model comprises a non-linear structural feature extraction unit and a correlation analysis unit; wherein the non-linear structural feature extraction unit is configured to extract a non-linear structure of the point cloud features X and the non-linear structure g of the RGB features Y, respectively; and the correlation analysis unit is configured to perform a correlation maximization on the extracted non-linear structure $f$ and the non-linear structure g with a correlation analysis method.

12. A terminal device, comprising a memory, a processor, and computer programs stored on the memory and capable of running on the processor, wherein the processor implements the vision-LiDAR Sion method of claim 1 when executing the computer programs.

13. The terminal device according to claim 12, wherein the performing coordinate system conversion and rasterization on the point cloud data in turn and extracting features to obtain point cloud features further comprises:
    converting the point cloud data from a point cloud coordinate system to an image coordinate system, wherein each pixel point after conversion corresponds to a point in space;
    performing a H×W rasterization on an x-y plane under the image coordinate system, and forming H×W=P pillars after the H×W rasterization, wherein H and W respectively represent a number of grids in x and y directions in a two-dimensional plane; obtaining distances $X_c$, $Y_c$, $Z_c$ from a point cloud to a center of gravity O in the P pillars and projections $X_p$, $Y_p$ from the point cloud to the center of gravity O in the x and y directions according to real three-dimensional coordinates and reflectivity of the point cloud, and obtaining enhanced 9-dimensional point cloud features in combination with the real three-dimensional coordinates and reflectivity of the point cloud to form a tensor of (9, P, A), wherein N represents a number of point clouds in each pillar; and
    extracting features, for each pillar, using a PonitNet algorithm, to generate a vector of (64, P, N) wherein 64 represents 64-dimensional, and then performing an operation of taking a maximum value and linear processing to obtain a pseudo image of (256, H, W), wherein 256 represents 256-dimensional.

14. The terminal device according to claim 13, wherein the non-linear structural feature extraction unit comprises a first deep neural network model and a second deep neural network model, wherein
    the first deep neural network model extracts a deep neural network model $f(X; W_f)$ of the non-linear structure of the point cloud features X to obtain the non-linear structure $f$ of the point cloud features X, wherein $W_f$ represents the first deep neural network model; and
    the second deep neural network model extracts a deep neural network model $g=g(Y; W_g)$ of the non-linear structure of the RGB features Y, to obtain the non-linear structure g of the RGB features Y, wherein $W_g$ represents the second deep neural network model.

15. The terminal device according to claim 14, wherein a specific processing process off the correlation analysis unit comprises:
maximizing correlations of the extracted non-linear structures, $f$ and $g$ through the correlation analysis method:

$$\max_{W_f,W_g,U,V} \frac{1}{N} tr\left(U^T f(X; W_f) g(Y; W_g)^T V\right)$$

$$\text{s.t. } U^T\left(\frac{1}{N} f(X; W_f) f(X; W_f)^T + r_x I\right)U = I$$

$$V^T\left(\frac{1}{N} g(Y; W_g) g(Y; W_g)^T + r_y I\right)V = I$$

$$u_i^T f(X; W_f) g(Y; W_g)^T v_j = 0, i \neq j$$

wherein N represents the number of point cloud in each pillar, $U=[u_1 u_2 \ldots u_L]$, $V=[v_1 v_2 \ldots v_L]$ are respectively mapping matrixes of output features of the first deep neural network and the second deep neural network by correlation analysis, L represents a total number of elements of the mapping matrix U and a total number of elements of the mapping matrix V, $u_i$ is an i-th element of the mapping matrix U and $v_j$ is a j-th element of the mapping matrix V, T represents transposition, I is a feature after fusion, $r_x>0, r_y>0, r_x$ r are regularization parameters for an estimation of a sample covariance of the point cloud features X, and $r_y$ is a regularization parameter for an estimation of a sample covariance of the RGB features Y.

16. The terminal device according to claim 15, wherein the vision-LiDAR fusion method further comprises a step of training a fusion model, comprising:
    selecting data of a public data set KITTI as a training set, wherein the training set comprises public RGB images and public point cloud data;
    extracting features of the public RGB images in the training set to obtain public RGB features;
    performing coordinate system conversion and rasterization on the public point cloud data in the public data set in turn and adopting a PointNet algorithm to extract features to obtain public point cloud features; and
    inputting the public RGB features and the public point cloud features into the fusion model, and adopting a stochastic gradient descent method to optimize parameters of the fusion model and obtain a well-trained fusion model.

* * * * *